(No Model.)

J. W. COOKE.
ARTIFICIAL MOTHER.

No. 333,602. Patented Jan. 5, 1886.

Witnesses.
John Edwards Jr.
John A. Lewis.

Inventor.
John W. Cooke.
By James Shepard Atty

UNITED STATES PATENT OFFICE.

JOHN W. COOKE, OF PLAINVILLE, CONNECTICUT.

ARTIFICIAL MOTHER.

SPECIFICATION forming part of Letters Patent No. 333,602, dated January 5, 1886.

Application filed June 24, 1885. Serial No. 169,669. (No model.)

*To all whom it may concern:*

Be it known that I, JOHN W. COOKE, of Plainville, in the county of Hartford and State of Connecticut, have invented certain new and useful Improvements in Artificial Mothers, of which the following is a specification.

Figure 1:
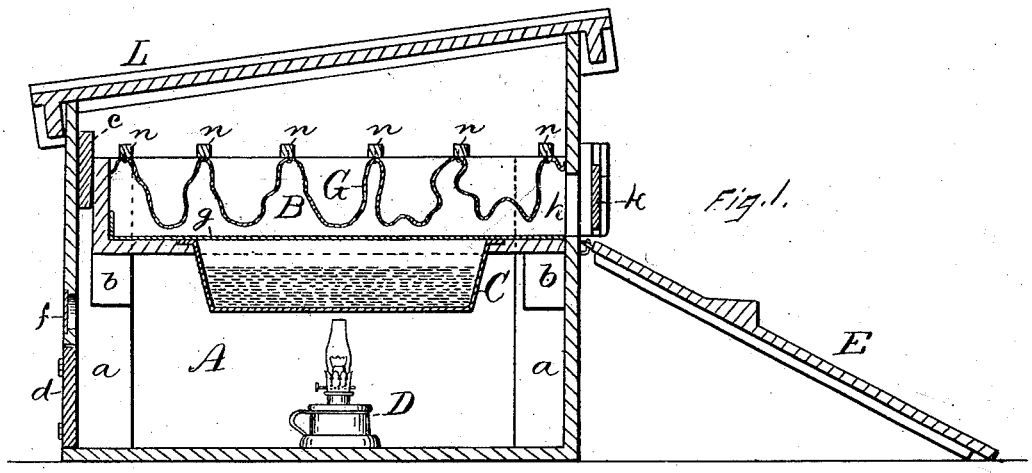
Figure 2:
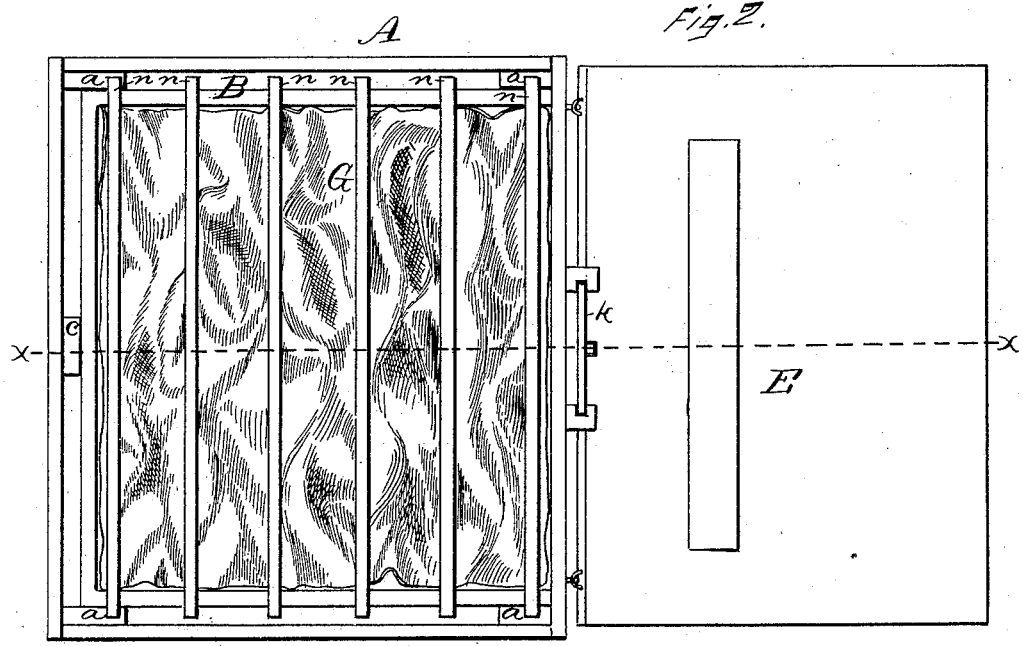

In the accompanying drawings, Figure 1 is a vertical section on line $x\ x$ of Fig. 2 of my device for brooding chickens, and Fig. 2 is a plan view of the same with the roof removed.

The main part of the device is in the form of a box or house, A. In each corner of this box is an upright or cleat, $a$, to the sides of which I fix a suitable block or bracket, $b$, upon which to support the tray B. This tray is provided with vertical walls upon three of its sides, and it is made small enough to be received inside of the uprights $a$, as shown in Fig. 1, thereby leaving an air-space between the walls of the tray and the box proper. For convenience in removal, and also to assist in ventilation, I make this tray a little less from front to rear (from right to left, as shown in the drawings) than the inside of the box, and I hold it pressed up against the front by means of the wedge $c$. In the bottom of this tray an opening is made, within which to place a flanged vessel, C, for the reception of water. In the lower chamber, underneath the tray B and under the water-vessel C, I place a small lamp, D.

For convenience in placing the lamp in position and removing it for filling or cleaning, I provide the rear of the box or house A with a small door, $d$.

In order to enable one to conveniently look at the lamp without opening this door to see if the lamp is burning properly, I provide the house with a small window, $f$, just above the door.

I cover the bottom of the tray B and the top of the water-receptacle C with a thin platform, $g$, of proper material, preferably of metal, and this platform I cover with sand or other suitable material, which will make the young birds comfortable. At the front of the tray is an opening, $h$, through which, when not obstructed, the young birds may make their exit and run down the inclined platform E to the ground. This opening I close, when desired, by means of a vertically-sliding door, $k$, arranged to slide in suitable ways, which are so formed that the door stands a little distance from the sides of the box or house, thereby leaving an open space, to assist in ventilation. The platform E is secured to the box or house by means of staples and hooks, so that it can be readily detached and attached when it is desired to change the location of the device.

G designates a flexible sheet of sacking or suitable material, which, when it is extended, is preferably a little wider than the inside of the tray, and is considerably longer than the dimensions of the tray from front to rear. This flexible sheet I secure at regular intervals to slats $n$, which slats are a little longer than the tray is wide, so that their ends may rest upon the side walls of the tray B, as shown in Fig. 2, the slats being placed at regular intervals apart, and the flexible material bagging down between the slats, to form a yielding surface for the young birds to nestle under. The sacking should be long enough, so that when distributed evenly over the whole tray it will bag down low enough for the youngest and smallest birds. As the birds grow older and larger, the sacking can be made to bag down a less distance by turning back one end of it and making use of less than the whole length. When this is done, the slats upon that portion of the sacking which is used will be spread farther apart, so as to hold the sacking between them at a greater elevation above the platform. Over the complete device I place the roof L, which is made in the form of a shallow box-cover, which shuts over the box proper and is removable therefrom. The sides of the box A may be left of such height as to not quite reach the roof, so as to leave a space for ventilation, the roof being made a little larger than the box, so as to form a loose fit.

In starting the mother or brooder it is preferable to fill the water-vessel with warm water, then light the lamp, after which a very small flame will keep the water warm. The water, acting as a reservoir for heat, will keep the compartment over the platform $g$ at a uniform heat.

I am aware that a prior patent shows a chicken-brooder consisting of a casing, heating-pipes surrounded by a box having openings in the top, strips of flannel held above the box that incloses the heating-pipes by means of bars or rods, and a pipe for conducting fresh air into the box, and that a German patent shows a brooder having various compartments, one of which contains a lamp for heating, and others of which contain ventilating-orifices. All of said prior art is hereby disclaimed.

I claim as my invention—

1. The box or house provided with the tray B, having an opening, the flanged water-vessel C, placed within said opening, and the platform g, covering the water-vessel and bottom of the tray, substantially as described, and for the purpose specified.

2. The combination of the tray having vertical walls upon two or more sides, the sheet of flexible material of about the width of said tray in one direction, but longer than the tray in the other direction, and the slats n, secured to said sheet at different points along its length, with the ends of the slats projecting beyond the side edges of said sheet, substantially as described, and for the purpose specified.

3. The artificial mother herein described, consisting, essentially, of the box or house provided at its lower story with the compartment for receiving the lamp; the removable tray B, the water-receptacle C, platform g, suitable covering for the birds to nestle under, and the removable roof L, substantially as described, and for the purpose specified.

JOHN W. COOKE.

Witnesses:
ROBERT C. USHER,
JOSEPH FLYNN.